United States Patent
Tanaka et al.

(10) Patent No.: US 7,391,178 B2
(45) Date of Patent: Jun. 24, 2008

(54) ROBOT CONTROLLER AND ROBOT SYSTEM

(75) Inventors: Michiharu Tanaka, Fukuoka (JP);
Hirokazu Kariyazaki, Fukuoka (JP);
Minoru Yamamoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/521,549

(22) PCT Filed: Apr. 21, 2003

(86) PCT No.: PCT/JP03/05066

§ 371 (c)(1),
(2), (4) Date: Sep. 23, 2005

(87) PCT Pub. No.: WO2004/009303

PCT Pub. Date: Jan. 29, 2004

(65) Prior Publication Data

US 2006/0108960 A1    May 25, 2006

(30) Foreign Application Priority Data

Jul. 18, 2002    (JP) ................................ 2002-209490

(51) Int. Cl.
*G05B 19/04* (2006.01)
(52) U.S. Cl. .................................................... 318/568.2
(58) Field of Classification Search ............ 318/568.21; 84/568.11
See application file for complete search history.

(56) References Cited

U.S. PATENT DOCUMENTS

| | | | | |
|---|---|---|---|---|
| 3,920,972 A | * | 11/1975 | Corwin et al. ............... 700/251 |
| RE30,132 E | * | 10/1979 | Irie ............................. 318/568.15 |
| 4,442,387 A | * | 4/1984 | Lindbom ..................... 318/568.13 |
| 4,648,783 A | * | 3/1987 | Tan et al. ......................... 414/730 |
| 4,661,797 A | * | 4/1987 | Schmall .......................... 340/561 |
| 4,795,998 A | * | 1/1989 | Dunbar et al. ..................... 338/5 |
| 5,280,622 A | * | 1/1994 | Tino ................................ 700/255 |
| 5,347,459 A | * | 9/1994 | Greenspan et al. ........... 700/255 |
| 5,363,474 A | * | 11/1994 | Sarugaku et al. ............. 700/256 |

(Continued)

FOREIGN PATENT DOCUMENTS

| JP | 62-24305 A | 2/1987 |
|---|---|---|
| JP | 5-345286 A | 12/1993 |
| JP | 7-20284 A | 4/1995 |
| JP | 9-193060 A | 7/1997 |

*Primary Examiner*—Lincoln Donovan
*Assistant Examiner*—Robert W Horn
(74) *Attorney, Agent, or Firm*—Sughrue Mion, PLLC

(57) ABSTRACT

A robot control apparatus with great safety is provided by detecting access of a teacher to a robot and automatically reducing the operating speed of the robot when the teacher accesses the robot. The robot control device equipped with a pendant (10) to be manipulated by a teacher, for controlling the operation of a robot on the basis of an operation command from the pendant (10), includes a detecting device (8) for detecting the position of the teacher; a signal processing unit (11) for receiving a signal from the detecting device to produce the position information of the teacher; and a limited speed selecting unit (12) for selecting the operating speed of the robot on the basis of the position information. The robot is controlled at the maximum speed set at the operating speed selected by the limited speed selecting unit (12) on the basis of the operation command from the pendant (10).

2 Claims, 12 Drawing Sheets

U.S. PATENT DOCUMENTS

| | | | |
|---|---|---|---|
| RE36,631 E * | 3/2000 | Tanabe et al. | 318/568.13 |
| RE36,929 E * | 10/2000 | Takayama et al. | 318/568.11 |
| 6,587,752 B1 * | 7/2003 | Saito | 700/264 |
| 6,597,971 B2 * | 7/2003 | Kanno | 700/245 |
| 6,665,588 B2 * | 12/2003 | Watanabe et al. | 700/259 |
| 6,668,951 B2 * | 12/2003 | Won | 180/9.1 |
| 6,778,092 B2 * | 8/2004 | Braune | 340/679 |
| 6,778,867 B1 * | 8/2004 | Ziegler et al. | 700/79 |
| 6,845,297 B2 * | 1/2005 | Allard | 700/259 |
| 6,898,528 B2 * | 5/2005 | Zorka et al. | 701/301 |
| 6,907,309 B2 * | 6/2005 | Zipperer | 700/130 |
| 6,917,855 B2 * | 7/2005 | Gonzalez-Banos et al. | 700/245 |
| 6,933,695 B2 * | 8/2005 | Blumenkranz | 318/568.11 |
| 7,038,165 B2 * | 5/2006 | Okuda et al. | 219/121.78 |
| 7,047,107 B2 * | 5/2006 | Minoshima et al. | 700/245 |
| 7,050,860 B2 * | 5/2006 | Muneta et al. | 700/3 |
| 7,066,291 B2 * | 6/2006 | Martins et al. | 180/167 |
| 7,079,924 B2 * | 7/2006 | Galbraith | 700/245 |
| 7,084,900 B1 * | 8/2006 | Watanabe et al. | 348/94 |
| 7,086,293 B2 * | 8/2006 | Heiligensetzer et al. | 73/795 |
| 7,103,145 B2 * | 9/2006 | Wong et al. | 378/117 |
| 7,118,365 B2 * | 10/2006 | Shirahata et al. | 425/139 |
| 7,124,027 B1 * | 10/2006 | Ernst et al. | 701/301 |
| 7,127,100 B2 * | 10/2006 | Wenzel et al. | 382/154 |
| 7,129,664 B2 * | 10/2006 | Kubo et al. | 318/567 |
| 7,151,848 B1 * | 12/2006 | Watanabe et al. | 382/141 |
| 2006/0108960 A1 * | 5/2006 | Tanaka et al. | 318/568.21 |

* cited by examiner

ROBOT CONTROLLER AND ROBOT SYSTEM

TECHNICAL FIELD

This invention relates to a robot in a teaching playback system, and more particularly to a robot control apparatus for assuring safety of a worker or operator during working in access to a robot by limiting a pendant operation of a teacher in access to the robot during teaching, or the operation of the robot not watched carefully by the worker or operator.

BACKGROUND ART

Now referring to the drawing, an explanation will be given of a conventional robot control apparatus. FIG. 12 is a view showing the configuration of the conventional robot control apparatus.

In FIG. 12, reference numeral 101 denotes a robot connected to a robot control apparatus 105. A working tool 102 for working is attached to the tip of a wrist of the robot 101. The robot control device 105 is connected to a pendant 106 employed to conduct the editing such as registering of a working program, or changing of a registered working program by operating the robot 101, performing registering of a position thereof or registering of a work. The robot control apparatus includes a safety shelf surrounding the operating range of the robot 101, a safety shelf door 108 to a gateway to the safety shelf, and a safety shelf door opening/closing detecting device 109 for detecting the opened/closed status of the safety shelf door 108. The safety shelf door opening/closing device 109 is connected to the robot control deice 105.

The working is done by controlling the robot 101 in a manner of moving the working tool 102 on the basis of the above working program for a work 104 fixed to a work holding device 103 installed in the vicinity of the robot 101.

In the position registering of the robot 101 which is a part of the working program, a teacher manipulates the pendant 106 to operate the robot 101 so that the working tool 102 attached to the wrist is positioned at a prescribed position relative to the work 104 and the position is registered in a storage member not shown within a robot controlling device through the operation of the pendant 106. The changing of the registered position of the robot 101 can be executed likewise.

In order to assure the safety of the teacher, the procedure in teaching will be explained below.

The teacher changes the operation mode of the robot into a teaching mode and opens the safety shelf door 108 to enter the safety shelf 107.

As regards the operation mode of the robot 101, its maximum operating speed of the robot in the teaching mode is limited by informing the robot control apparatus of the facts that the operation mode is in the teaching mode and the safety shelf door opening/closing detecting device 109 is producing an opened status signal of the safety shelf door 108.

The maximum operating speed in this teaching mode is limited to limited to 250 mm/sec in an end effect unit.

Next, in positioning the working tool 102 to a prescribed position of the work 104, the robot 101 is operated by manipulating the pendant. At this time, the teacher must pay an attention to the robot 1, working tool 102, work holding device 103, work 104 and peripheral devices of these components.

In order to assure the safety of the teacher himself from the operation of the robot 101 not intended by the teacher due to an erroneous manipulation of the pendant 106, the maximum operating speed in the teaching mode is limited. Thus, the teacher performs the teaching at a position apart from the robot 101 or work 104 so that he can perform an evading action against the inadvertent operation of the robot 101 during teaching.

(Prior Art 1)

However, according to the shape and size of the work 104, the shape of the working tool 102, an the arrangement of the work holding device 103 and peripheral devices, as the case may be, the teacher must comes near the robot 101 or work 104 for teaching. In a conventional robot control apparatus, in such a case, in order that the teacher can take an evading action against the inadvertent operation of the robot 101 due to the erroneous manipulation, setting of the pendant 106 is made to reduce the maximum operating speed of the robot 101. Thereafter, the teacher performs the teaching.

On the other hand, in a product manufacturing factory where a plurality of robots are installed, the teaching for the robots is individually performed. However, as the case may be, a plurality of persons simultaneously perform the teaching in order to reduce the teaching time. In this case, the individual teacher pays an attention to the movement of the robot which is an object for teaching and a working tool attached to the robot or their interference with the peripheral devices, but pays less attention to the robot which is not an object for teaching and its peripheral devices.

Also in the case where the plurality of robots are controlled by a single robot control apparatus, as in the case described above, less attention is paid to the matters which are not the object for teaching.

If the operator stands outside the operation region of each robot, no interference occurs between the operator and the robot. However, where the teaching area difficult to confirm visually is taught or the point of teaching is finely adjusted, the operator comes near the robot. In the large-scale product manufacturing factory, the plurality of robots come near one another. Therefore, when the operator accesses a certain robot, he will enter the operation region of the other robots.

In such a case, between the first operator teaching the first robot and the second operator teaching the second robot, because of the operation based on the subjective impression or carelessness by the second operator, the second robot may give serious injury to the first operator through the operation directed to the first operator who stands within the operation region of the second robot or interference and collision with him.

Also in a production system in which a plurality of robots are controlled by a single robot control apparatus, where an operator performs teaching in an operating range of the plurality of robots, because of the operation based on the subjective impression or carelessness by the operator, as in the case, there is a danger that the robot which is not the object for teaching gives serious injury to the operator through the operation directed to the operator and or interference and collision with him.

(Prior Art 2)

In a conventional robot control apparatus, these inconveniences was dealt with by interrupting the power source of driving the other robot than the operating object, thereby braking each of axial motors.

(Prior Art 3)

As still another prior art, the Unexamined Japanese Patent Application Publication No. Hei11-165291 discloses a method in which while an industrial robot is operating, when a man or object enters the operating range of a robot, this is detected by a sensor, and a warning is issued to prevent an accident from occurring.

(Prior Art 4)

Further, the Unexamined Japanese Patent Application Publication No. Hei10-264080 discloses a method in which an operation abnormality detecting index for detecting abnormality in a moving speed, a moving acceleration, moving direction and moving position or abnormality in the angular speed of a wrist axis is created by CPU, and when the abnormality is detected as a result of comparison of the detecting index with a reference value, a robot is stopped.

In the prior art 1, when the teacher performs the teaching for the robot in access thereto, because of his desire in the improvement in an operation efficiency and forgetting of setting, as the case may be, he may operate the robot and perform the teaching therefore without reducing the maximum operating speed of the robot. In this case, if the pendant is erroneously manipulated, the robot makes the operation not intended by the teacher so that the teacher is surprised. Where the robot further comes near the teacher, he does not have a time to evade it.

The prior art 2 provides the method for surely not operating the robot by the brake attached to each axis by interrupting the driving power source of the other robot than the object for teaching. However, a plurality of persons cannot simultaneously perform the teaching in order to shorten the teaching time. This leads to a possibility of difficulty in startup of a product manufacturing factory. Further, it is actually impossible to teach the working by cooperation by a plurality of robots.

The prior art 3 provides a method for preventing an accident from occurring by issuing a warning when the person or object enters the operation range of the robot while the robot is operating. This method, if the robot is operating for product manufacturing, is an efficient means. However, during teaching, the operator frequently performs the teaching in the operation region of the robot. Therefore, whenever the warning is issued, the operation for continuing the teaching such as a releasing operation is required, thus leading to attenuation of the teaching efficiency.

The prior art 4 provides a method of detecting that the robot has made an abnormal operation to stop the robot. This abnormal operation is the movement to the direction different from a designated direction and deviation from a designated path. This method detects such abnormal operation to stop the robot. Further, the abnormal operation will occur owing to the erroneous operation of components within the control apparatus due to the temperature environment and electromagnetic environment around the robot or the interference status between the robot and peripheral devices. This method is an efficient means for preventing the abnormal operation from continuing. However, the operation not intended by the operator of the robot in a teaching scene is mainly attributable to the erroneous operation. When the erroneous operation occurs, the robot control apparatus cannot determine whether or not the designated moving speed and moving path of a robot control point have been intended by the operator. Thus, the detection in this system is made impossible, thereby making it impossible to stop the robot before the robot gives an injury to the operator.

As described above, the conventional robot control apparatus has a problem that it is difficult to assure the safety of the operator when performing the teaching involved with the robot operation in access to the robot.

DISCLOSURE OF THE INVENTION

In view of these problems, this invention is accomplished. An object of this invention is to provide a robot control apparatus which can enhance the safety of a teacher by detecting the teaching in access to a robot to automatically reduce the operating speed of the robot, and assuring the time for an evading action to the teacher when the robot operates at the direction or speed not intended by the teacher owing to the erroneous manipulation of a pendant.

Another object of this invention is to provide a robot control apparatus capable of building a robot system which can assure the safety of an operator by limiting the operation of the other robot than the robot for teaching so that an operator is not given an injury from the other robot than the robot for teaching owing to the erroneous operation by another operator in a situation where a plurality of robots are arranged closely, and issuing a warning or alarm to pay an attention to the operator.

In order to solve the problems described above, this invention is constructed as follows.

The invention described in embodiment 1 is a robot control apparatus equipped with a pendant to be manipulated by a teacher, for controlling the operation of a robot on the basis of an operation command from the pendant, characterized by including:

a detecting device for detecting the position of the teacher;

a signal processing unit for receiving a signal from the detecting device to produce the position information of the teacher; and a limited speed selecting unit for selecting the operating speed of the robot on the basis of the position information, wherein the robot is controlled at the maximum operating speed selected by the limited speed selecting unit on the basis of the operation command from the pendant.

In accordance with this configuration, by reducing the maximum operating when a teacher accesses the robot, a robot with great safety can be provided which permits the operator to take an evading action for a non-intended action of the robot.

The invention described in embodiment 2 is a robot control apparatus equipped with a pendant to be manipulated by a teacher, for controlling the operation of a robot on the basis of an operation command from the pendant and a detected position in a position detector attached to each axis, characterized by including:

a robot position computing unit for computing the coordinate position of the robot on the basis of the detected position; and a limited speed selecting unit for selecting the operating speed of the robot on the basis of an output from the robot position computing unit, wherein the robot is controlled at the maximum operation selected by the limited speed selecting unit on the basis of the operation command from the pendant.

In accordance with this configuration, since the maximum operating speed of the robot can be varied according to the position of the robot when the teacher accesses the robot, by reducing the maximum operating speed when a working tool attached to the robot is near the teacher, attenuation of the working efficiency of the teaching can be minimized.

The invention described in embodiment 3 is a robot control apparatus equipped with a pendant to be manipulated by a teacher, for controlling the operation of a robot on the basis of an operation command from the pendant and a detected position by a position detector attached to each axis, characterized by including:

a detecting device for detecting the position of the teacher;

a signal processing unit for receiving a signal from the detecting device to produce the position information of the teacher;

a robot position computing unit for computing the coordinate position of the robot on the basis of the detected position; and a limited speed selecting unit for selecting the operating speed of the robot on the basis of outputs from the signal processing unit and the robot position computing unit, wherein the robot is controlled at the maximum operating speed selected by the limited speed selecting unit on the basis of the operation command from the pendant.

In accordance with this configuration, since the maximum operating speed of the robot can be varied according to the position of the robot when the teacher comes near the robot, by reducing the maximum speed at a working position, decreased is a chance for a working tool and work to be injured by interference between the working tool and work attributable to the not-intended operation of the robot by an erroneous operation.

The invention described in embodiment 4 is a robot control apparatus equipped with a pendant to be manipulated by a teacher, for controlling the operation of a robot on the basis of an operation command from the pendant and a detected position in a position detector attached to each axis, characterized by including:

an input unit for inputting a position monitoring signal for monitoring the position of the robot;

a position storage member for storing the detected position when the position monitoring signal is inputted;

a permitted value storage member for storing a prescribed permitted range of the operation of each the axis;

a position difference computing member for computing a position difference between the detected position and the detected position stored in the position storage member; and a comparing member for comparing the position difference and the permitted range, wherein while the position monitoring signal is inputted, if the position difference exceeds the permitted range as a result of comparison in the comparing member, the operation of the robot is stopped.

In accordance with this configuration, when the operator accesses the other robot to which he does not pay his attention, by monitoring the position of the other robot, a robot with great safety can be provided in which the operator will not be injured by the other robot.

The invention described in embodiment 5 is a robot control apparatus equipped with a pendant to be manipulated by a teacher, for controlling the operation of a robot on the basis of an operation command from the pendant and a detected position in a position detector attached to each axis, characterized by including:

an input unit for inputting a position monitoring signal for monitoring the position of the robot;

a position storage member for storing the detected position when the position monitoring signal is inputted;

a permitted value storage member for storing a prescribed permitted range of the operation of each the axis;

a position difference computing member for computing a position difference between the detected position and the detected position stored in the position storage member; and a comparing member for comparing the position difference and the permitted range, wherein while the position monitoring signal is inputted, the detected position is stored after comparison has been made by the comparing member, and if the position difference exceeds the permitted range as a result of comparison in the comparing member, the operation of the robot is stopped.

In accordance with this configuration, when the operator accesses the other robot to which he does not pay his attention, by monitoring the other robot at a prescribed speed, the teaching for the other robot can be continued, and the robot with great safety can be provided in which the operator will not be injured by the other robot.

The invention described in embodiment 6 is a robot control apparatus equipped with a pendant to be manipulated by a teacher, for controlling the operation of a robot on the basis of an operation command from the pendant and a detected position by a position detector attached to each axis, characterized by including:

a robot position computing unit for computing the coordinate position of the robot on the basis of the detected position;

an input unit for inputting a position monitoring signal for monitoring the position of the robot;

a position storage member for storing the coordinate position when the position monitoring signal is inputted;

a permitted value storage member for storing a prescribed permitted range of the operation of each the axis;

a position difference computing member for computing a position difference between the coordinate position and the coordinate position stored in the position storage member; and a comparing member for comparing the position difference and the permitted range, wherein while the position monitoring signal is inputted, if the position difference exceeds the permitted range as a result of comparison in the comparing member, the operation of the robot is stopped.

The invention described in embodiment 7 is a robot control apparatus equipped with a pendant to be manipulated by a teacher, for controlling the operation of a robot on the basis of an operation command from the pendant and a detected position by a position detector attached to each axis, characterized by including:

a robot position computing unit for computing the coordinate position of the robot on the basis of the detected position;

an input unit for inputting a position monitoring signal for monitoring the position of the robot;

a position storage member for storing the coordinate position when the position monitoring signal is inputted;

a permitted value storage member for storing a prescribed permitted range of the operation of each the axis;

a position difference computing member for computing a position difference between the coordinate position and the coordinate position stored in the position storage member; and a comparing member for comparing the position difference and the permitted range, wherein while the position monitoring signal is inputted, the coordinate position is stored after comparison has been made by the comparing member, and if the position difference exceeds the permitted range as a result of comparison in the comparing member, the operation of the robot is stopped.

In accordance with these configurations, the range of position monitoring or speed monitoring can be set on a coordinate system of the robot. Thus, setting values can be determined on the basis of the information of arrangement of the robot before the robot system is built, thereby reducing the working time required for installing the robot system.

The invention described in embodiment 8 is a robot control apparatus, characterized in that the robot is equipped with a teaching device, and the permitted range can be set by the teaching device or an external control device through a predetermined interface included in the robot control apparatus.

In accordance with this configuration, various settings for the position control or speed control of the robot can be made by the teaching device, or made by the external control device having the information on the robot system.

The invention described in embodiment 9 is a robot control apparatus characterized in that if the position difference exceeds the permitted range, abnormality display or warning display is made on the teaching device.

The invention described in embodiment 10 is a robot control apparatus characterized in that it is provided with an output unit, and if the position difference exceeds the permitted range, abnormality display or warning display is outputted outside the robot control apparatus.

In accordance with these configurations, if the permitted range is exceeded in the position monitoring or speed monitoring, abnormality or warning can be issued so that the teacher's attention is called, thereby enhancing safety conscientiousness.

The invention described in embodiment 11 is a robot control apparatus characterized in that the coordinate position data is a spatial position data at a tip of combined arms of the robot; and the tip is a tip position of a tool whose tool size is known.

In this configuration, the position monitoring or speed monitoring of the working tool can be done.

The invention described in embodiment 12 is a robot control apparatus characterized in that the operation of the robot is stopped by making the operation command to each the axis zero, or interrupting driving energy to the robot.

In accordance with this configuration, if the permitted range is exceeded in the position control or speed control of the robot, the robot is stopped, thereby preventing expansion of injury.

The invention described in embodiment 13 is a robot system in which a plurality of robots are operated by a plurality of mans so as to permit the position or speed of each robot to be monitored by inputting a position monitoring signal through an input unit of a robot control device, characterized in that inputting of the position monitoring signal identifies that another operator operating another robot has entered a predetermined region of a certain robot being operated by an operator, thereby monitoring the position or speed of the robot.

In this robot system, when the teacher comes near a robot for which teaching is not performed in teaching a plurality of robots, the position monitoring or speed monitoring of the robot is done so that a system with great safety not injuring the teacher can be built.

As understood from the above explanation, in accordance with the robot control apparatus according to this invention, while a teacher performs the teaching in access to a robot or work holding device or within the operation range of the robot, even if the operation of the robot not intended by the teacher occurs owing to the erroneous manipulation of the pendant, since the robot is controlled at a low speed, the time enough for the teacher to take an evading action can be assured, thereby providing the effect of enhancing safety of the teacher.

Further, only if the wrist of the robot or working tool comes near the teacher, the maximum operating speed of the robot is reduced so that safety of the teacher can be enhanced. In addition, since the maximum operating speed of the robot is increased at a position remote from the working position by the robot, i.e. the teacher, attenuation of the teaching efficiency can be minimized.

Further, in accordance with this invention, in a situation where a plurality of robots are arranged closely, while the operator is performing the teaching for a robot which is an object for teaching, it is detected that he has entered the operating range of the robot which is not the object for operation or working and dangerous region attributable to the operation of the robot. The position of the robot at the time of detection is stored, and compared with the difference permitted value previously set. If the difference exceeds the permitted value, the robot is stopped, or its operating speed is limited, thereby proving the effect capable of the production system with robots with very great safety.

Where the operation of the robot is limited, the abnormality display or warning display of the robot is made on the pendant. In addition, since the robot control device issues the abnormality output or warning output, not only the operator but also the workers in the vicinity of him can know that there has been a chance to encounter the danger, thereby providing the effect of contribution to enhancing safety conscientiousness.

BEST MODE FOR CARRYING OUT THE INVENTION

Figure 1:
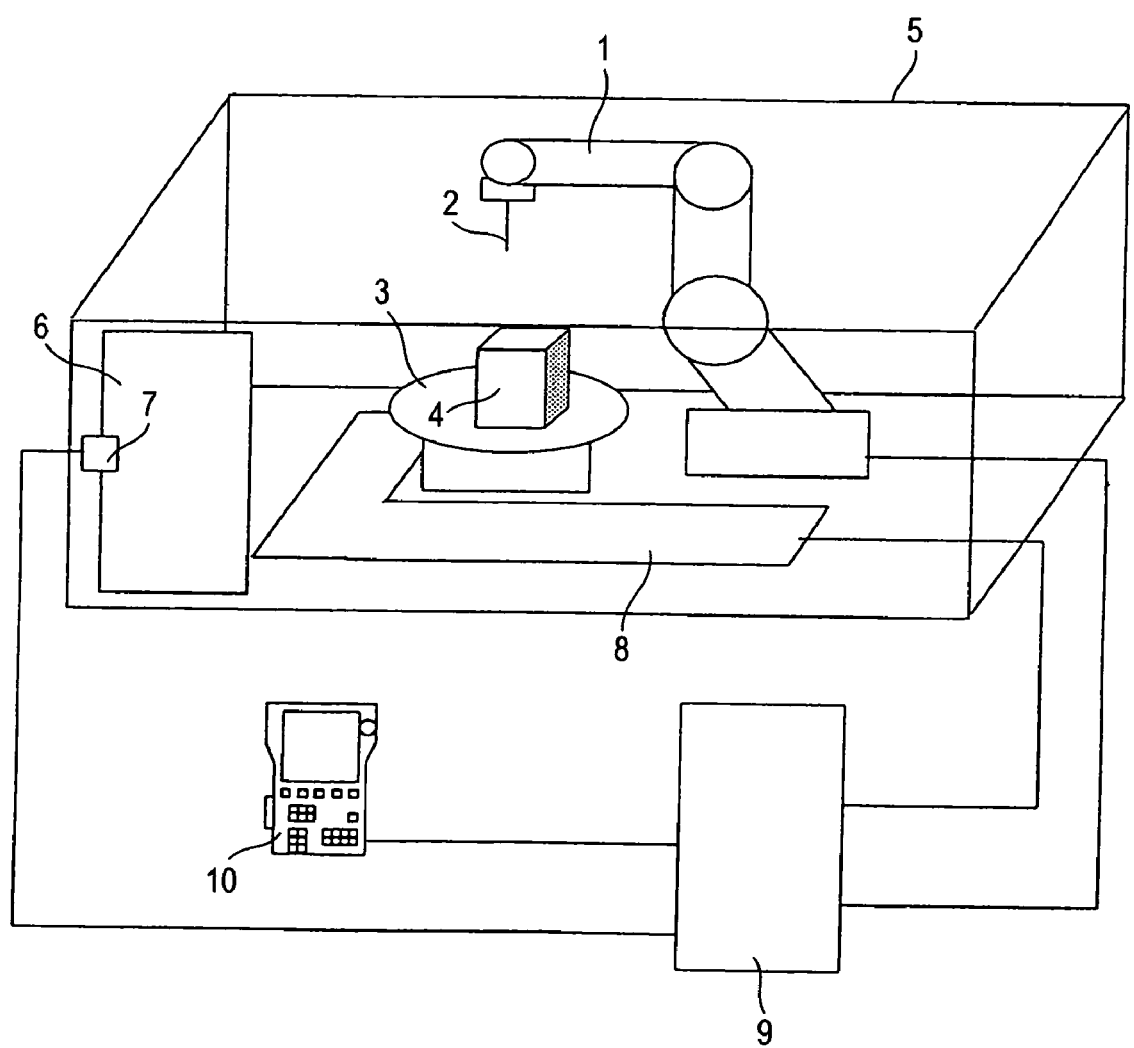
FIG. 1 is a view of the configuration of a robot system illustrating a first embodiment of this invention.

Now referring to the drawings, an explanation will be given of various concrete embodiments of this invention.

Embodiment 1

FIG. 1 is a view of the configuration of a robot system illustrating a first embodiment of this invention.

In FIG. 1, reference numeral 1 denotes a robot connected to a robot control apparatus. A working tool 2 for working is attached to the tip of a wrist of a robot 1. The robot control device is connected to a pendant 10 employed to conduct the editing such as registering of a working program, or changing of a registered working program by operating the robot 1, performing registering of a position thereof or registering of a work. The robot control apparatus includes a safety shelf surrounding the operating range of the robot 1, a safety shelf door 6 to a gateway to the safety shelf, and a safety shelf door opening/closing detecting device 7 for detecting the opened/closed status of the safety shelf door 6. An output signal from the safety shelf door opening/closing device 7 is connected to the robot control device 9.

A detecting device 8 is installed in the vicinity of the robot 1 and a work holding device 3. An output signal from the detecting device 8 is connected to the robot control device 9. The detecting device 8, when pressure higher or lower than a prescribed value is detected, supplies a signal to the robot control 9. This detecting device 8 may be e.g. a safety mat.

A robot system, before it operates, sets a first maximum operating speed and a second maximum operating speed in a teaching mode by the operation of the pendant 10 by a robot system structurer. These speeds are stored in a storage member not shown.

The second maximum operating speed is lower than the first maximum operating speed. The first maximum operating speed is usually 250 mm/sec, but may be lower than this value according to the condition such as the use and robot operating range.

The operation of the robot 1 in the teaching mode, and registering of its position and changing of the registered position are executed in the same as the prior art described above.

Figure 2:
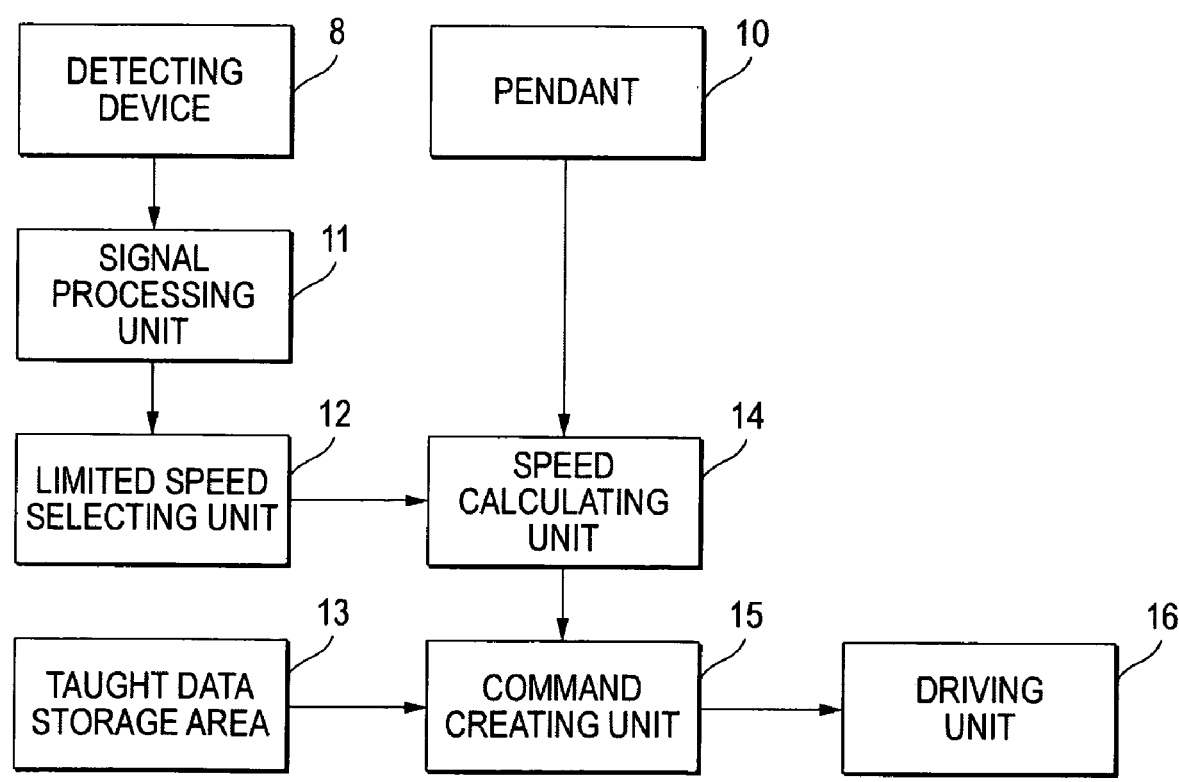
FIG. 2 is a block diagram of speed control according to this invention.

FIG. 2 is a block diagram showing speed control for executing this invention. The detecting device 8 serves to detect the position of a teacher. A signal from the detecting device 8 is supplied to a signal processing unit 11. The signal processing unit 11 supplies the signal read from the detecting device 8 to a limited speed selecting unit 12. The limited speed selecting unit 12 supplies, to a speed calculating unit 14, the limited speed selected according to the signal statue acquired from the signal processing unit 11 and operating mode designated from an operating unit not shown. By the manipulation of the pendant 10 by the teacher, the pendant 10 supplies an operating command to the speed calculating unit 14. The speed calculating unit 14 compares the limited speed supplied from the limited speed selecting unit 12 and the taught speed obtained from the operating command from the pendant 10. If the limited speed≧the taught speed, the speed override ratio=1 is supplied to a command creating unit 15. If the limited speed<the taught speed, the speed override ratio=limited speed/taught speed is supplied to the command creating unit 15. The command creating unit 15 reads the taught data stored in the taught data storage area 13 and corresponding to the operating command from the pendant 10, acquires the operating speed obtained from the taught speed of the taught data supplied by the speed override ratio supplied from the speed calculating unit 14 and supplies the operating command created to realize this operating speed to a driving unit 16. The driving unit 16 performs the servo driving control by means of a position controller, speed controller, current amplifier, etc., thereby operating the robot 1.

In the teaching mode, when the robot 1 is operated through the manipulation of the pendant 1, in order to operate the robot 1 largely, the operator can manipulate the pendant 10 outside the operating range of the robot 1. For this reason, even when an inadvertent operation of the robot occurs owing to an erroneous manipulation, since the maximum operating speed of the robot 1 in the teaching mode is limited by the first maximum speed, the teacher can take an evading action.

Further, since the teacher is present outside the operating range of the robot 1, the teacher will be not injured by the robot 1.

Now, where the teacher performs the teaching in a nearer position to the robot 1, work holding device 3 or work 4 according to the shape and size of the work 4, shape of the working tool 2 and arrangement of the work holding device 3 and peripheral devices, the teacher is present on the detecting unit 8 so that his weight is applied to the detecting unit 8. Thus, the detecting unit 8 detects the resultant stress and supplies the corresponding signal to the robot control device 9.

The robot control device 9 takes the signal from the detecting device 8 in the signal processing unit 11 through a signal input device not shown. The result therefrom is supplied to the limited speed selecting unit 12. Before the operation, the limited speed selecting unit 12 supplies the second maximum operating speed stored in the storage member not shown to the speed override ratio calculating unit 14. The override ratio calculating unit 14 calculates the speed override ratio with the second maximum operating speed as the limited speed on the basis of the speed data supplied from the taught data storage area 13. The command creating unit 15 creates the operating command to give the operating speed of the speed data from the taught data storage area 13 multiplied by the speed override ratio calculated, thereby operating the robot 1 through the driving unit 16. The driving unit 16 includes a servo amplifier and servo motor which are employed to drive the manipulator.

Thus, the robot 1 operates at a speed lower than the second maximum operating speed.

For this reason, the maximum operating speed of the robot while the teacher performs the teaching in access to the robot 1, work holding 3 or work 4 is the second maximum operating speed. Thus, in this status, even when the operation of the robot 1 not intended by the teacher occurs owing to the erroneous manipulation of the pendant 10, the teacher can take the evading action.

Embodiment 2

Figure 4:
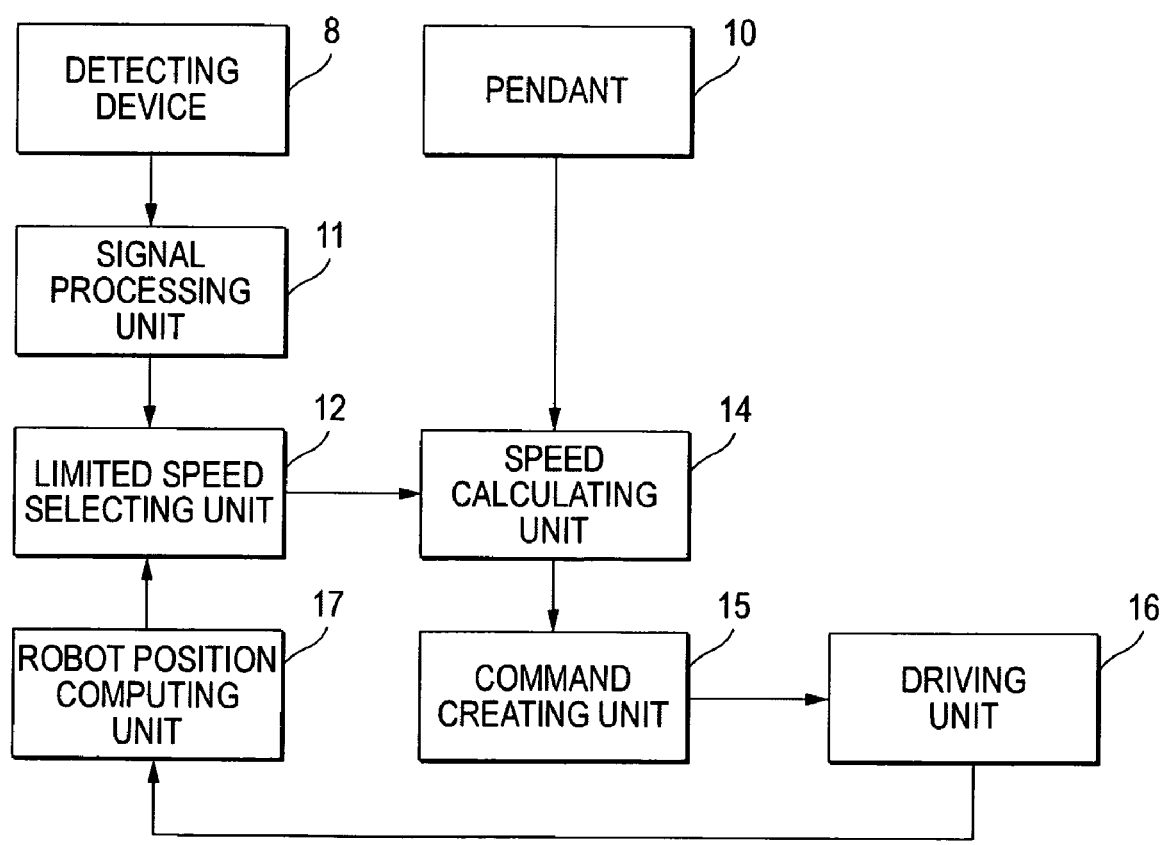
FIG. 4 is a block diagram of the second embodiment of this invention.

FIG. 4 is a block diagram of speed control according to the second embodiment of this invention. A driving unit 16 is provided with a position detector capable of detecting a position. On the basis of the signal from this position detector, a robot position calculating unit 17 calculates the present position of the robot. The limited speed selecting unit 12 selects the maximum speed on the basis of the outputs from the signal processing unit 11 and robot position calculating unit 17. The manner of selection will be explained below on the basis of a configuration view.

Figure 3:
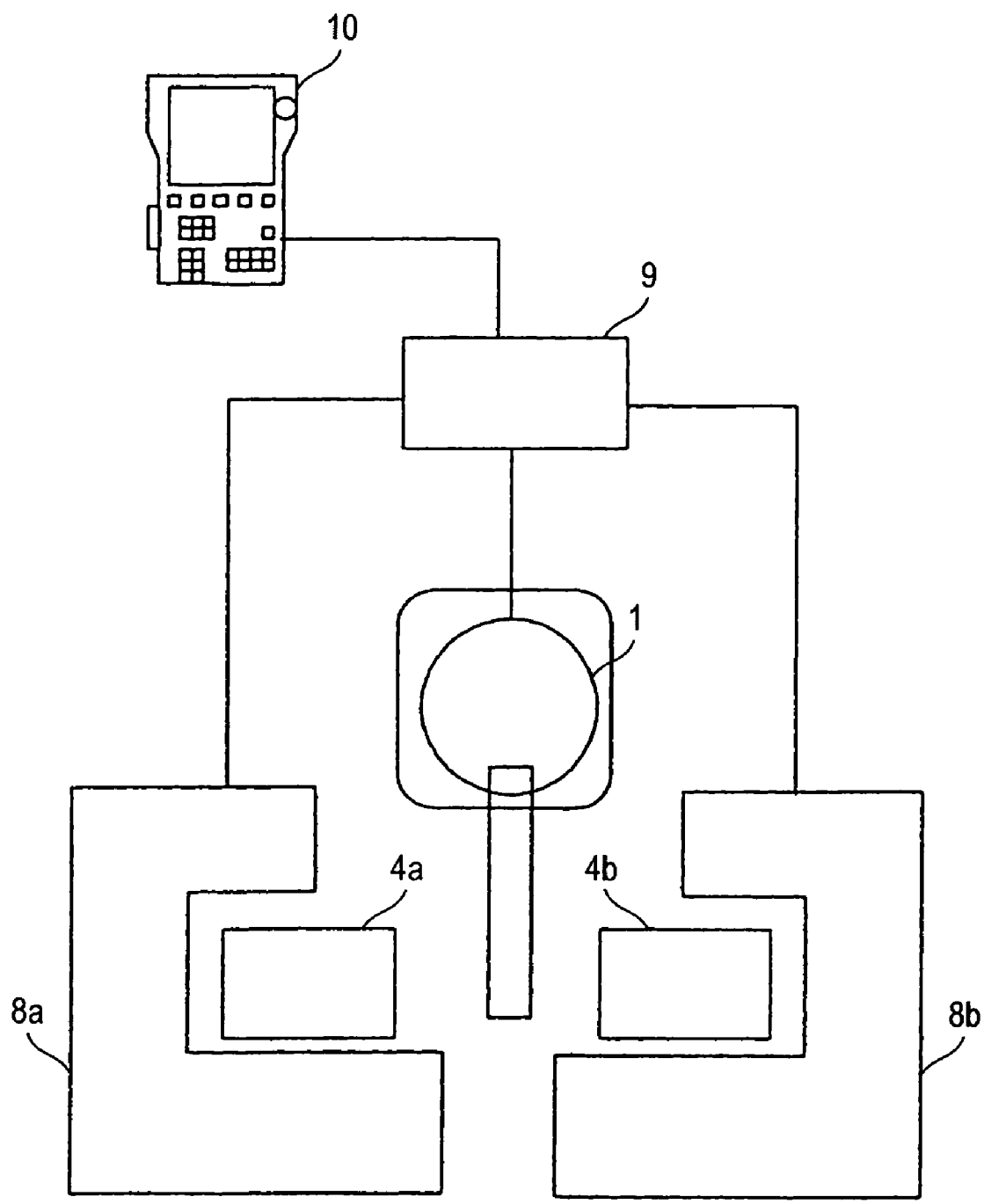
FIG. 3 is a view of the configuration of a robot system illustrating a second embodiment of this invention.

FIG. 3 is a view showing the configuration of a robot system showing the second embodiment of this invention.

In FIG. 3, reference numeral 1 denotes a robot connected to a robot control device 9. A work 4a and a work 4b for which working is to be carried out are arranged on the left and right side of the robot 1, respectively. Reference numerals 8a and 8b denote a plurality of detecting devices. When a predetermined pressure or lower is applied to the detecting devices 8a and 8b, these detecting devices supplies a signal to the robot control device 9, respectively. In FIG. 3, the working tool, work holding device, safety shelf, and other peripheral devices are not illustrated.

The robot system, before it operates, sets a first maximum operating speed, a second operating speed and a third operating speed in a teaching mode by the manipulation of the pendant 10 by a robot system builder. These speeds are stored in a storage member not shown of the robot control device 9.

The second and third maximum operating speeds are set at lower than the first maximum operating speed. The first maximum operating speed is usually 250 mm/sec, but may be lower than this value according to the condition such as the use and robot operating region.

The operation of the robot 1 in the teaching mode, and registering of its position and changing of the registered position are executed in the same as the prior art described above.

The working by the robot 1 requires the teaching for the work 4a and the teaching for the work 4b. Therefore, the teaching for the work 4a gives a chance of teaching to the teacher in access to the work 4b. Likewise, the teaching for the work 4b gives a chance of teaching to the teacher in access to the work 4a.

In the teaching in access to the work 4a or work 4b, the teacher performs the teaching on the detecting device 8a or detecting device 8b. Therefore, the detecting device 8a or 8b supplies a signal to the signal processing unit 11 of the robot control device 9. The result obtained therefrom is supplied to the limited speed selecting unit 12.

The robot control device 9 knows the position of an end effecter of the robot 1 on the basis of the information from the position detector of each servo axis. In response to the output from the signal processing unit 11 having processed the signal supplied from the detecting device 8a or 8b, the limited speed selecting unit 12 selects the limited speed as follows.

1) If the signal is produced from the detecting device 8a and the end effecter of the robot 1 is located on the side nearer to the work 4a than to the center of the robot 1, the limited speed is set at the third maximum operating speed.
2) If the signal is produced from the detecting device 8b and the end effecter of the robot 1 is located on the side nearer to the work 4a than to the center of the robot 1, the limited speed is set at the second maximum operating speed.
3) In a case other than the cases 1) and 2), the limited speed is set at the first maximum operating speed.

The limited speed thus selected is supplied to the speed override ratio calculating unit 14. Thus, the robot 1 is controlled so that it operates at the speed lower than the limited speed thus set.

Embodiment 3

Figure 5:
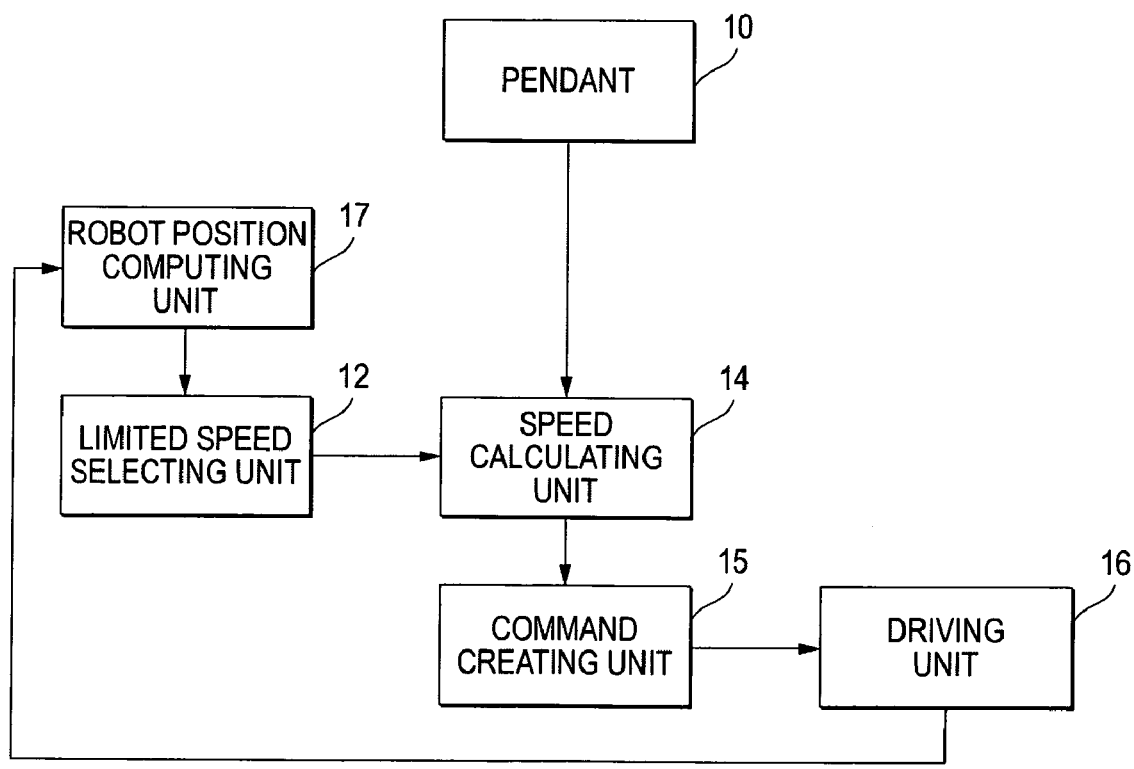
FIG. 5 is a block diagram of a third embodiment of this invention.

Now referring to FIG. 5, an explanation will be given of the third embodiment of this invention. The third embodiment intends to control the operating speed of the robot 1 on the basis of only the present position of the robot computed by the robot position computing unit 17.

The speed limited region in a robot operating range and the maximum operating speed in the speed limited region are stored in a storage area not shown.

The speed limited region can be defined in such a manner that the robot 1 is operated to register two end points, or the coordinate values of robot coordinates are registered by direct inputting from the pendant. These manners permit a rectangular parallelepiped to be defined on the robot coordinates.

In the robot control device 9, the position of the end effecter of the robot 1 is periodically computed by the robot position computing unit 17 using the information from the position detector of each servo axis. If this position is within the speed limited region, the corresponding operating speed is selected by the limited speed selecting unit 12 and the operating speed thus selected is supplied to the speed calculating unit 14.

On the pendant 10, a speed key for selecting one of three or so taught speeds of a robot is arranged. By depressing the speed key, the teacher can select a desired taught speed of the robot.

If the teacher desires to operate the robot in the + axis direction of the robot coordinates, he depresses the key of designating the movement to +X on the pendant. The pendant 10 informs the speed calculating unit 14 of depressing the +X key.

The speed calculating unit 14 creates a speed command according to the taught speed set at present. In this case, the speed calculating unit 14 compares the speed command Vp created on the basis of the command from the pendant 10 and the speed Vs selected by the limited speed selecting unit 12. As a result of comparison, if Vp>Vs, the speed calculating unit 14 supplies the speed command of Vs to the command creating unit 15. If Vp<Vs, the speed calculating unit 15 supplies the speed command of Vp to the command creating unit 15.

It is also possible to set a plurality of speed limited regions. Further, it is possible to display the maximum speed selected by the pendant 10 so that the teacher can confirm the maximum speed.

In this way, the operating speed of the robot will not exceed the speed selected by the limited speed selecting unit 12.

Embodiment 4

Where the working for a work is carried out by the robot, the working can be done by a single robot, but as the case may be, the working may be done by cooperation of a plurality of robots considering the working efficiency, direction conversion of the work, preparation of the work on a working table and removal of the work from the working table after working.

Figure 6:
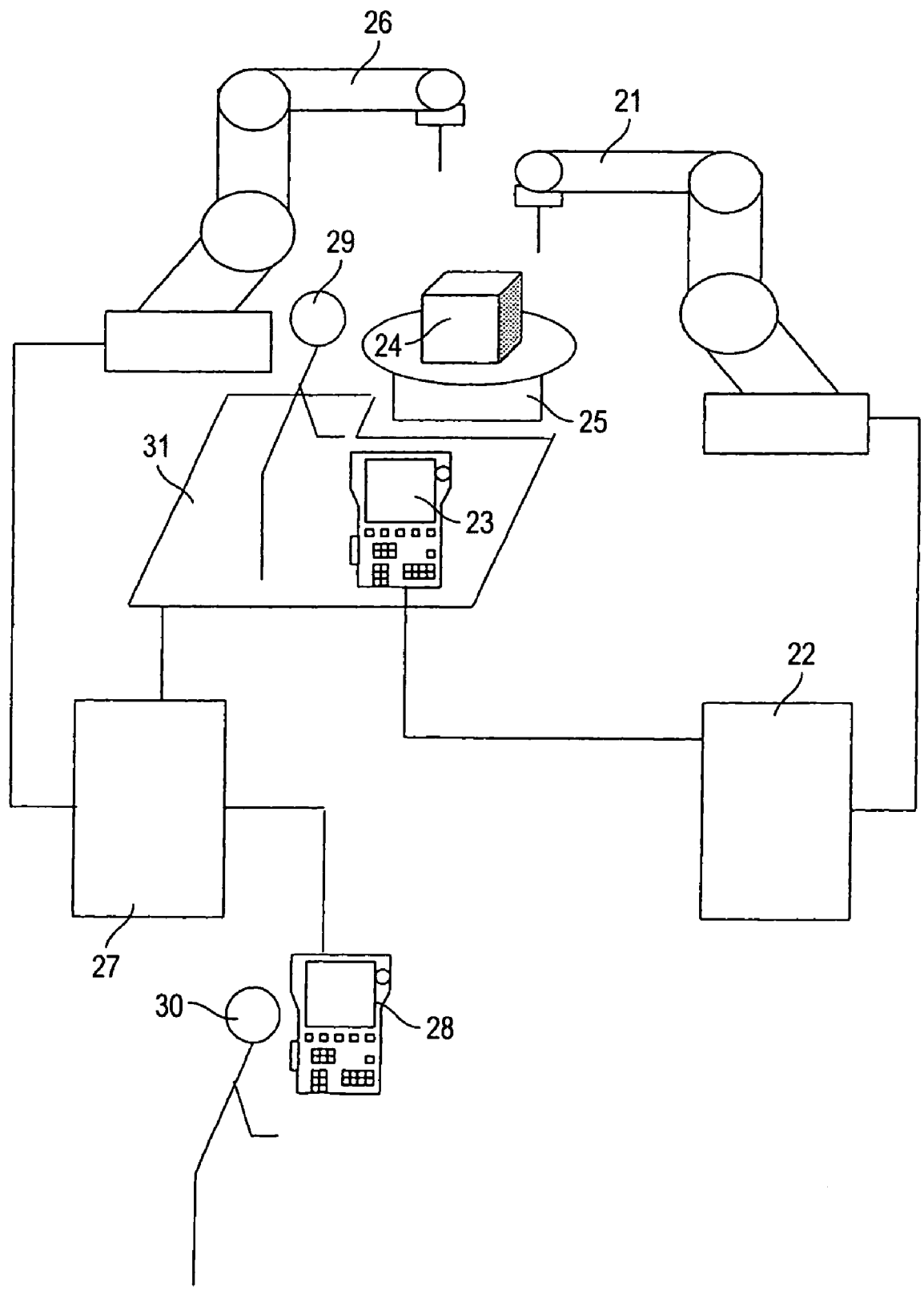
FIG. 6 is a view of the configuration of a robot system illustrating a fourth embodiment of this invention.

FIG. 6 is a view of the configuration of the robot system according to this embodiment.

In FIG. 6, reference numeral 21 denotes a robot connected to a robot control device 22. The robot control device 22 is connected to a first pendant 23 employed to conduct the editing such as registering of a working program, or changing of a registered working program by operating the first robot 21, performing registering of a position thereof or registering of working by the manipulation in the teaching. A working tool, which is attached to the tip of the wrist of the first robot 21, executes the working by implementing the above working program for the work 24 on the working table 25. On the other hand, reference numeral 26 denotes a second robot connected to a second robot control device 27 to which a second pendant 28 is connected. Reference numeral 31 denotes an operator detector for detecting that a first operator 29 has entered the operating range of the second robot 26 or a dangerous region due to the operation of the second robot 26 while he performs the teaching for the first robot 21, thereby supplying a position monitoring signal to the second robot control device 27.

In order that the operator does not enter the operating range of the two robots while the working for the work 24 based on the working programs by the two robots is performed, the operating range of the two robots are surrounded by a protection shelf not shown.

Where the teaching for the two robots is performed, within the protection shelf, the first operator 29 attends to the teaching for the first robot 21 whereas a second operator 30 attends to the teaching for the second robot 26. When the first operator 29 approaches the work 24 for the purpose of teaching of the details of the work 24, he will enter the operating range of the second robot 26. Thus, the operator detector 31 detects this fact, thereby supplying a detected signal to the second robot control device 27. In response to this detected signal, the second robot control device 27 limits the operation of the second robot 26.

The operator detector 31 may be any one of a safety mat, a sonic object detector and an optical object detector.

Figure 7:
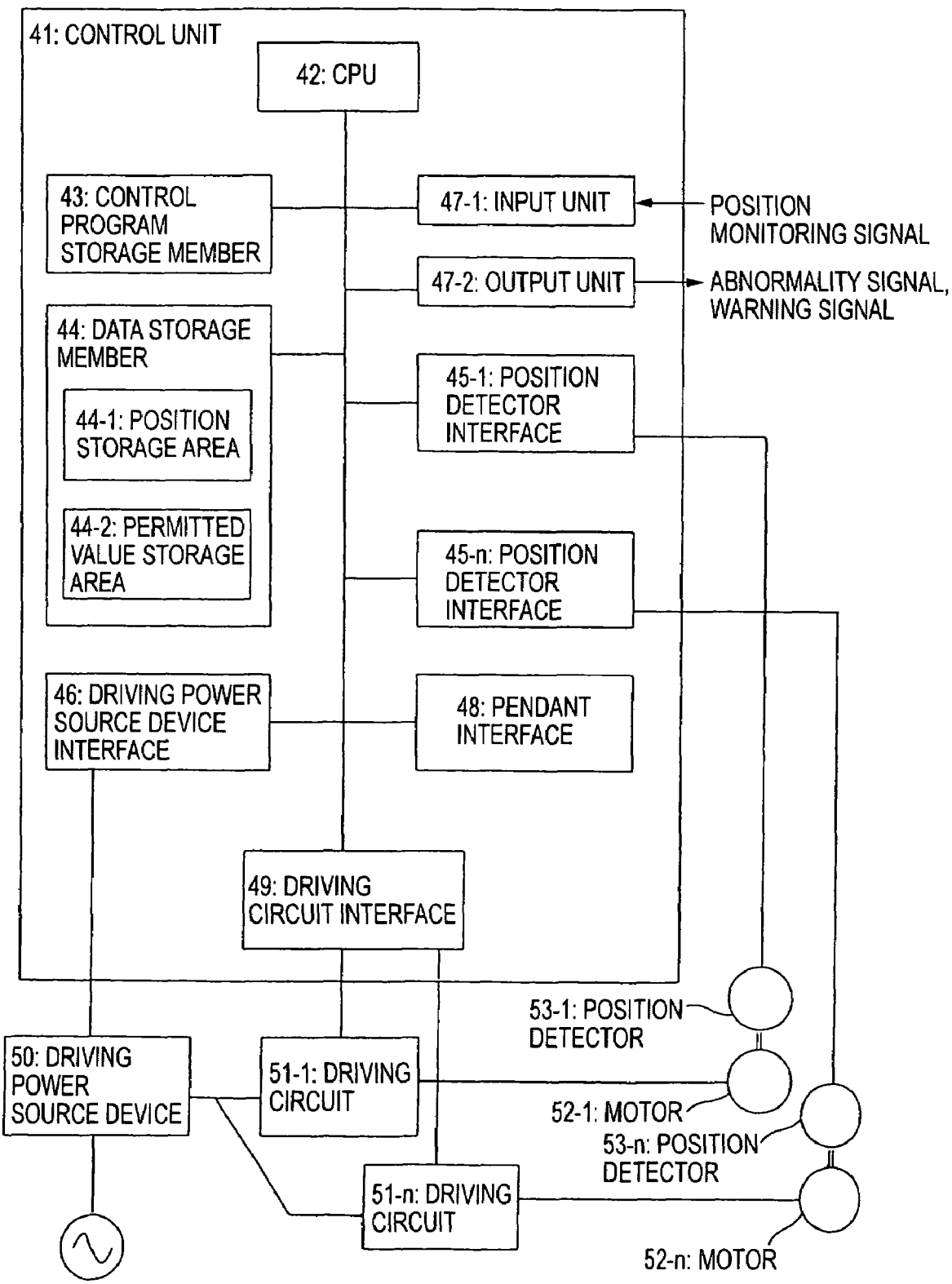
FIG. 7 is a block diagram of the control unit in the robot control apparatus in the fourth embodiment of this invention.

An explanation will be given of the operation of the second robot 26. FIG. 7 is a block diagram of a control unit of the robot control device, a driving power source device, a driving circuit and a motor.

In FIG. 7, in the control unit 41, on the basis of a control program stored in a control program storage member 43, a CPU 42 executes the unified control of the robot including creation of a driving command for each of motors 52-1, . . . 52-*n* of the second robot. Reference numeral 44 denotes a data storage member which is employed to write or read the data necessary for robot control.

A driving power source interface 46 included in the control unit 41 is connected to a driving source device 50 connected to a power source so that it controls the supply or interruption of the driving power to driving circuits 51-1, . . . 51-*n* which are connected to the driving power source device 50 so as to receive the driving power. The driving circuits 51-1, . . . 51-*n* are connected to the motors 52-1, . . . 52-*n* so that they control the driving of the motors 52-1, . . . 52-*n* under the control by the driving circuit interface 49 included in the control unit 41. Position detectors 53-1, . . . 53-*n* are attached to the motors 52-1, . . . 52-*n* so that they supply detected positions of the motors 52-1, . . . 52-*n* to position detector interfaces 45-1, . . . 45-*n* included in the control unit 41, respectively. The detected positions are employed for the driving control of the motors 52-1, . . . 52-*n*.

The control unit 41 further includes an input unit 47-1 and output unit 47-2 for executing signal input/output between the second robot control device 27 and the outside, and a pendant interface for executing signal exchange for the second pendant 28.

The input unit 47-1 is assigned a position monitoring signal from the operator detector 31 and the output unit 47-2 is assigned an abnormal output or a warning output for the outside.

The data storage member 44 receives the detected positions from the position detectors 53-1, . . . 53-*n* attached to the motors 52-1, . . . 52-*n* through the position detector interfaces 45-1, . . . 45-*n*, and stores them in a position storage area 44-1 at predetermined timings. A position difference between the detected position received at a predetermined period and the detected position already stored in the position storage area 44-1 is computed. The computed position difference is compared with a position difference permitted value stored in a permitted value storage area 44-2. If the computed position exceeds the difference permitted value, the driving current to the motors 52-1, . . . 52-*n* is controlled through the driving circuit interface 49 so that the driving command to the motors 52-1, . . . 52-*n* is made zero, thereby stopping the second robot 26. Otherwise, the driving power source device 50 is controlled through the driving power source device interface 46 so as to interrupt the driving power source necessary to drive the motors 52-1, . . . 52-*n*, thereby stopping the second robot 26. In addition to stopping the second robot 26, abnormality display or warning display is made on the second pendant 28 through the pendant interface 48. Further, abnormality output or warning output can be made outside the second robot control device 27 through the output unit 47-2.

Incidentally, the position difference permitted values are inputted in the permitted value storage area 44-2 through the pendant interface 48 by manipulating the second pendant 28. They can be set by an external control device through a serial interface (not shown) included in the control unit 41.

Figure 8:
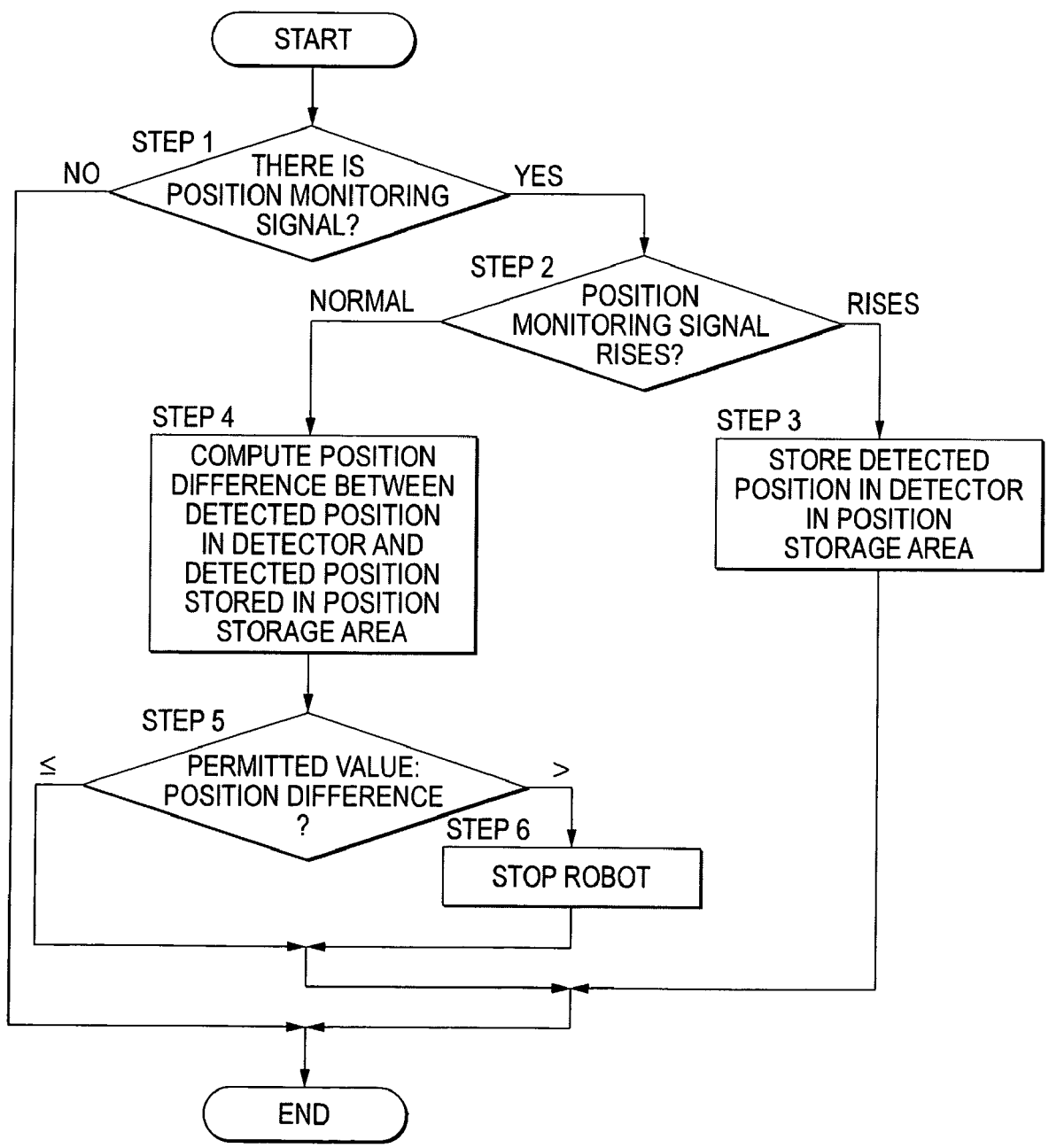
FIG. 8 is a processing flowchart in the fourth embodiment of this invention.

Referring to the flowchart of FIG. 8 showing the embodiment of this invention, the operation described above will be explained in further detail.

A position monitoring signal from the operator detector 31 is inputted through the input unit 47-1.

If there is the position monitoring signal, i.e. if the operator detector 31 detects that the first operator has entered the operating range of the second robot 26 while he is performing the teaching for the first robot 21, or entered the dangerous region attributable to the operation of the second robot 26, the operation proceeds to step 2. If not, the operation proceeds to End (Step 1).

It is determined whether or not there is a rise in the position monitoring signal. If there is the rise in the position monitoring signal, the operation proceeds to step 3. If not, the operation proceeds to step 4. Whether or not the signal has risen can be easily determined by the logical operation of the signal status read the last time and that read at this time (step 2).

The detected positions from the position detectors 53-1, . . . 53-*n* are read in through the position detector interfaces 45-1, . . . 45-*n* and stored in the position storage area 44-1. The detected positions to be stored may be the values read for motor control, or may be the values converted for the position control of the motors (step 3).

The detected positions from the position detectors 53-1, . . . 53-*n* are read in through the position detector interfaces 45-1, . . . 45-*n* (or may be the values already read or converted as in step 3), and their differences from the detected positions stored in the position storage area 44-1 are computed (step 4).

The position differences computed in step 4 are compared with the difference permitted values stored in the permitted value storage area 44-2. If the position differences exceed the difference permitted values, the operation proceeds step 6. If not, the operation proceeds to End.

The robot is stopped and display/output of abnormality or warning is also made. The robot can be stopped by stopping the motors 52-1, . . . 52-*n* with the driving power source being energized under the control by the driving circuit interface 49, or other wise by interrupting the driving power source through the driving power source device 50 (step 6).

In accordance with this embodiment, while the operator is performing the working such as teaching, it is detected that he has entered the operating range of the robot which is not the object for working and dangerous region attributable to the operation of the robot. The position of the robot at the time of detection is stored, and compared with the difference permitted value previously set. If the difference exceeds the permitted value, the robot is stopped. Namely, since the operating range of the robot is limited, the operator at issue can be protected from the danger from the operation of the robot due to the erroneous operation by the operator who is operating the robot which is not the object for operating or working.

Where the operation of the robot is limited, the abnormality display or warning display of the robot is made on the pendant. In addition, since the robot control device issues the abnormality output or warning output, not only the operator but also the workers in the vicinity of him can know that there has been a chance to encounter the danger, thereby contributing to enhancing safety conscientiousness.

Embodiment 5

Next, the fifth embodiment of this invention will be explained. The configuration and block diagram of the robot control device and two-robot system, which are the same as those shown in FIGS. 6 and 7, will not be explained in detail.

Figure 9:
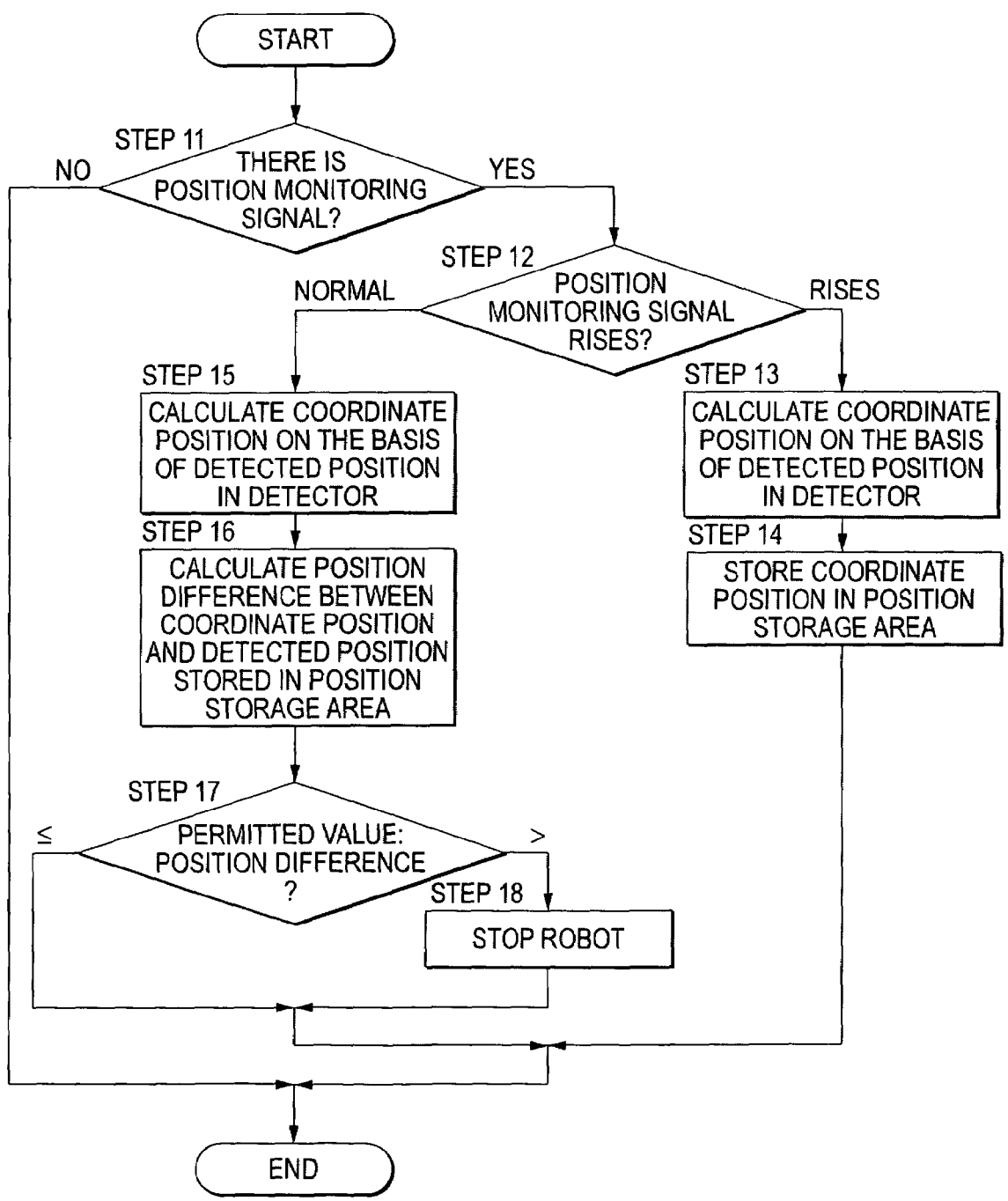
FIG. 9 is a processing flowchart in a fifth embodiment of this invention.

Referring to the flowchart of FIG. 9 showing the fifth embodiment of this invention, the operation described above will be explained.

A position monitoring signal from the operator detector 31 is inputted through the input unit 47-1.

If there is the position monitoring signal, i.e. if the operator detector 31 detects that the first operator has entered the operating range of the second robot 26 while he is performing the teaching for the first robot 21, or entered the dangerous region attributable to the operation of the second robot 26, the operation proceeds to step 12. If not, the operation proceeds to End (Step 11).

It is determined whether or not there is a rise in the position monitoring signal. If there is the rise in the position monitoring signal, the operation proceeds to step 13. If not, the operation proceeds to step 15 (step 12).

The detected positions from the position detectors 53-1, ... 53-n are read in through the position detector interfaces 45-1, ... 45-n (or may be the values already read or converted as in step 3 in the fourth embodiment) and converted into the coordinate system of the second robot 26 (step 13).

The position data on the coordinate system converted in step 13 are stored in the position storage area 44-1 (step 14).

The detected positions from the position detectors 53-1, ... 53-n are read in through the position detector interfaces 45-1, ... 45-n (or may be the values already read or converted as in step 13), and converted into the coordinate system of the second robot 26 (step 15).

The position differences are computed between the position data on the coordinate system converted in step 15 and the position data stored in the position storage area 44-1 (step 16).

The position differences computed in step 16 are compared with the difference permitted values stored in the permitted value storage area 44-2. If the position differences exceed the difference permitted values, the operation proceeds step 18. If not, the operation proceeds to End.

The robot is stopped and display/output of abnormality or warning is also made. The robot can be stopped by stopping the motors 52-1, ... 52-n with the driving power source being energized under the control by the driving circuit interface 49, or otherwise by interrupting the driving power source through the driving power source device 50 (step 18).

In the fifth embodiment, the difference permitted value is stored in the permitted value storage area 44-2 in the format of e.g. millimeter in terms of the position of each coordinate axis. In the fourth embodiment, the difference permitted value is stored in the permitted value storage area 44-2 in the format of e.g. pulses in terms of a motor position.

The fourth embodiment and fifth embodiment of this invention can be individually or simultaneously carried out, thereby achieving the same effect.

In accordance with this embodiment, the same operational effect as the fourth embodiment can be obtained. Further, in accordance with this embodiment, since the difference permitted values to be previously set are inputted on the coordinate system of the robot in units of e.g. millimeter, they can be easily determined on the basis of an arrangement view of the robot.

Embodiment 6

In the flowchart of FIG. 8 in the fourth embodiment, between step 4 and step 5, a step is added for storing the detected positions read from the position detectors 53-1, ... 53-n though the position detector interfaces 45-1, ... 45-n in step 4 in the position storage area 44-1. In this case, like the case described above, the detected positions to be stored may be the values read for motor control, or may be the values converted for the position control of the motors.

Otherwise, in the flowchart of FIG. 9 in the fifth embodiment, between step 16 and step 17, a step is added for storing the detected positions read from the position detectors 53-1, ... 53-n though the position detector interfaces 45-1, ... 45-n in step 15 in the position storage area 44-1 as the position data converted into the coordinate system of the second robot 26. In this case, like the case described above, the detected positions to be stored may be the values read for motor control, or may be the values converted for the position control of the motors.

In accordance with this embodiment, while the operator is performing the working such as teaching, it is detected that he has entered the operating range of the robot which is not the object for working and dangerous region attributable to the operation of the robot. The position of the robot at the time of detection is stored, and compared with the difference permitted value previously set. If the difference exceeds the permitted value, the robot is stopped. Since the position data to be stored in the position storage area 44-1 are sequentially updated so that the operating speed of the robot is limited. Thus, the operator at issue can be protected from the danger from the operation of the robot due to the erroneous operation by the operator who is operating the other robot, and the operation of the other robot can be continued at the limited speed.

Where the operating speed of the robot is limited, the abnormality display or warning display of the robot is made on the pendant. In addition, since the robot control device issues the abnormality output or warning output, not only the operator but also the workers in the vicinity of him can know that there has been a chance to encounter the danger, thereby contributing to enhancing safety conscientiousness.

Embodiment 7

Figure 10:
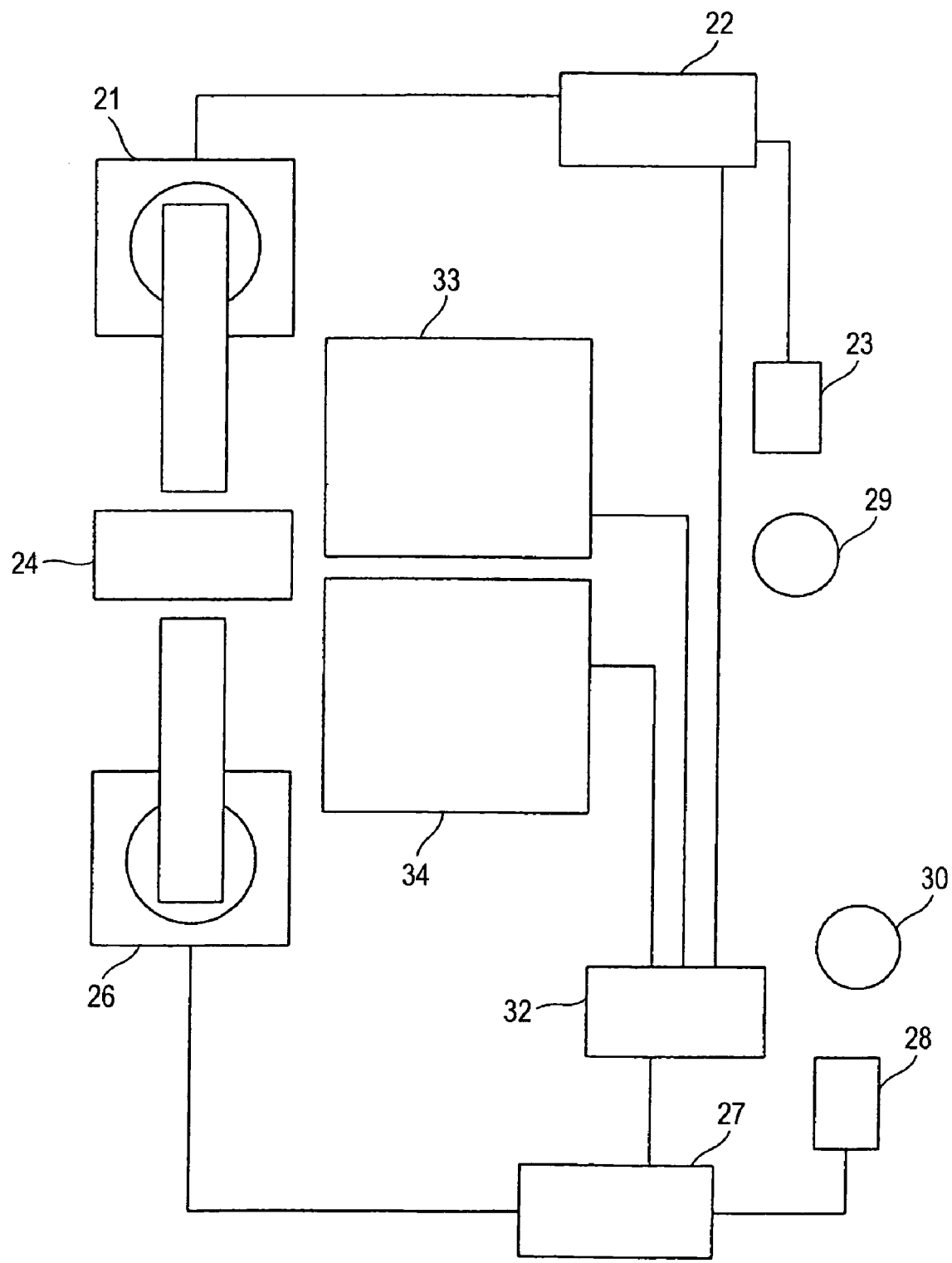
FIG. 10 is a view of the configuration of a robot system illustrating a seventh embodiment of this invention.

FIG. 10 is a concrete configuration view of two-robot system using this invention.

In FIG. 10, like reference numerals refer to like parts in the configuration of the robot system showing the embodiment of this invention in FIG. 6.

In FIG. 10, reference numeral 33 denotes a first robot side operator detector 33, and reference numeral 34 denotes a second robot side operator detector 34. Both detectors are connected to an operator detection/control device 32. The operator detection/control device 32 is connected to the first robot control device 22 and the second robot control device 27.

Figure 11:
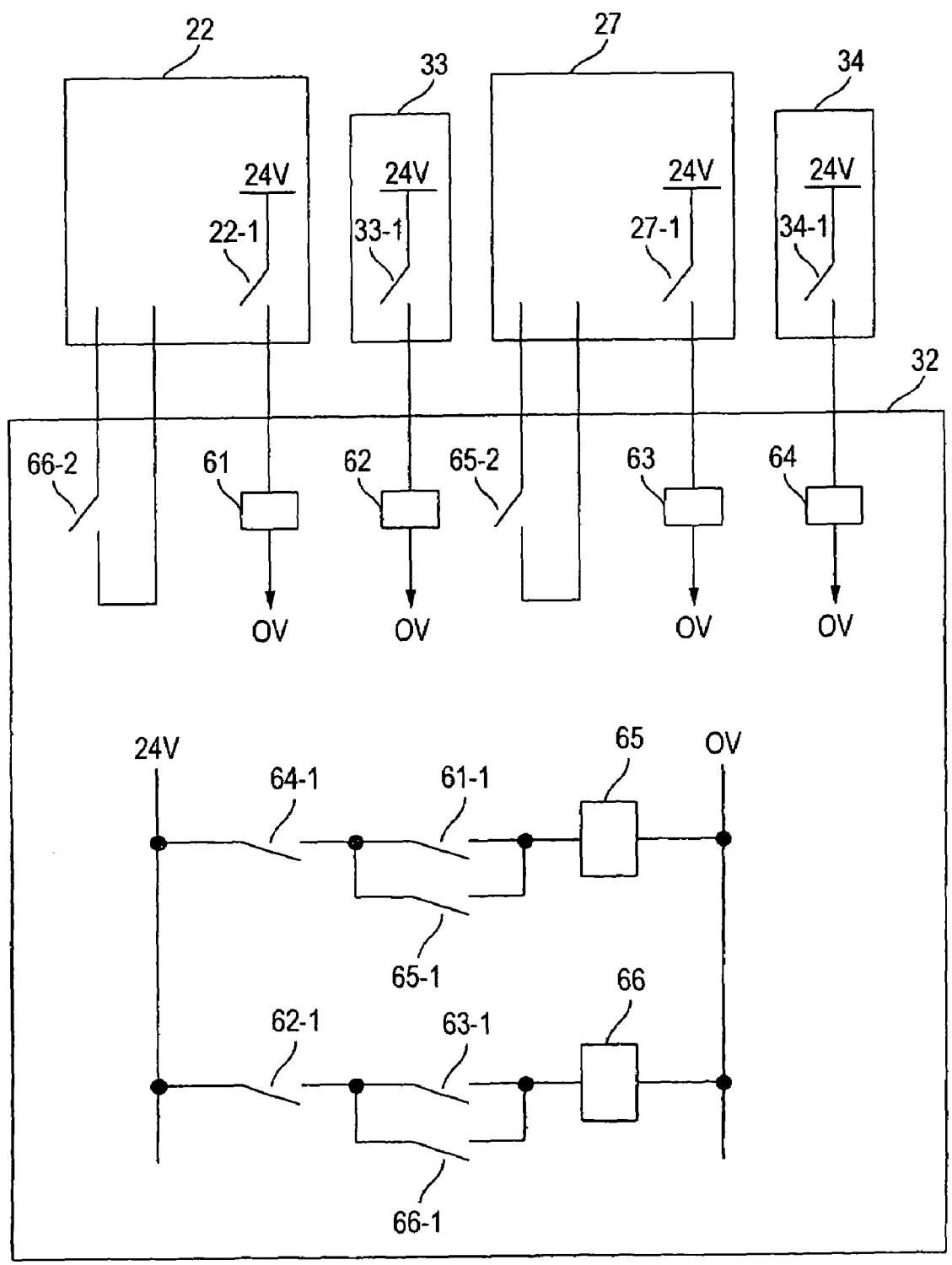
FIG. 11 is a connecting view of an operator detecting control apparatus in the seventh embodiment of this invention.
Figure 12:
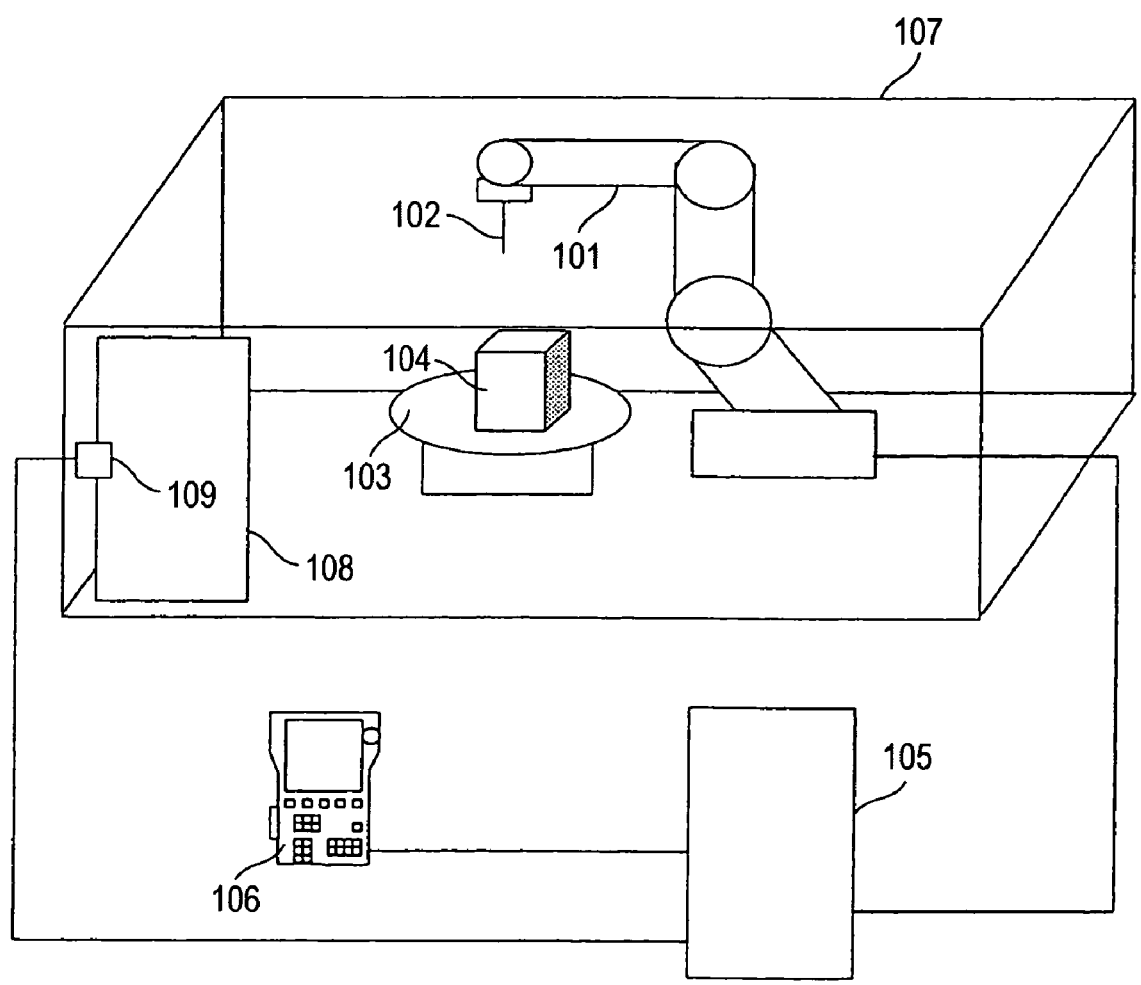
FIG. 12 is a view showing the configuration of a conventional robot control apparatus.

FIG. 11 is a connection view of the operator detector control device 32 and its outskirts.

The first robot side operator detector 33 is e.g. a safety mat. The first robot side operator detector 33 has a contact 33-1 which is closed when the operator is present on the safety mat. The contact 33-1 is connected to the coil of a first operator detecting relay 62 of the operator detection/control device 32. Thus, when the first robot side operator detector 33 detects the operator, the operator detecting relay 62 is exited to turn on.

Likewise, the second robot side operator detector 34 is e.g. a safety mat. The second robot side operator detector 34 has a contact 34-1 which is closed when the operator is present on the safety mat. The contact 34-1 is connected to the coil of a second operator detecting relay 64 of the operator detection/control device 32. Thus, when the second robot side operator detector 34 detects the operator, the operator detecting relay 64 is exited to turn on.

The first robot control device 22 is connected to the coil of a first robot operable relay 61 of the operator detection/control device 32 in such a manner that by manipulating the first pendant 23 with the driving power source for the first robot 21 being energized, an output signal 22-1 which is closed in the operable state of the first robot 21 is produced. Thus, if the first robot 21 is in the operable state with the driving power source of the first robot 21 being energized, the first robot operable relay 61 is energized to turn on.

Likewise, the second robot control device 27 is connected to the coil of the second robot operable relay 63 of the operator detection/control device 32 in such a manner that by manipulating the second pendant 28 with the driving power source for the first robot 26 being energized, an output signal 27-1 which is closed in the operable state of the second robot 26 is produced from the output unit 47-2. Thus, if the second robot 26 is in the operable state with the driving power source of the second robot 26 being energized, the second robot operable relay 63 is energized to turn on.

In the operator detection/control device 32, a series connection of a normally-opened contact 64-1 of the second operator detecting relay 64 and a normally-opened contact 61-1 of the first robot operable relay 61 is connected to the coil of a second robot limiting relay 65. Further, a normally-opened contact 65-1 of the second robot limiting relay 65 is connected in parallel to the normally-opened contact 61-1 of the first robot operable relay 61 to constitute a protection circuit.

Likewise, a series connection of a normally-opened contact 62-1 of the first operator detecting relay 62 and a normally-opened contact 63-1 of the first robot operable relay 63 is connected to the coil of a first robot limiting relay 66. Further, a normally-opened contact 66-1 of the first robot limiting relay 66 is connected in parallel to the normally-opened contact 63-1 of the second robot operable relay 63 to constitute a protection circuit.

The other normally-opened contact 65-2 of the second robot limiting relay 65 is connected to the second robot control device 27. The other normally-opened contact 66-2 of the first robot limiting relay 66 is connected to the first robot control device 22.

An explanation will be given of the case where the first operator 29 enters the operating range of the second robot 26 in a state where the first operator 29 is operating the first robot 21 using the first pendant 23 and the second operator 30 is operating the second robot 26 using the second pendant 28.

Since the first robot is being operated by the first operator 29, the first robot 21 is in the operable state or operating. In this state, the output 22-1 is closed so that the first robot operable relay 61 is energized to turn on.

In this state, the second robot side operator detector 34 detects that the first operator 29 has entered the operating range of the second robot 26 or a dangerous region due to the operation of the second robot 26. Thus, the contact 34-1 of the second robot side operator detector 34 is closed so that the second operator detecting relay 64 is energized to turn on.

Since the normally-opened contact 61-1 of the first robot operable relay 61 and the normally-opened contact 64-1 of the second operator detecting relay 64 are both closed, the second robot limiting relay 65 is energized to turn on. Thus, the other normally-opened contact 65-2 of the second robot limiting relay 65 is communicated with the second robot control device 27.

The second robot control device 27 receives the corresponding signal through the input unit 47-1. Since it is determined that there is the detected signal, the operation explained in the fourth to sixth embodiments will be carried out.

The position monitoring and/or speed monitoring of the second robot 26 are continued while the normally-opened contact 65-2 of the second robot limiting relay 65 is closed. If the first operator 29 goes out from the operating range of the second robot 26 or the dangerous region due to the operation of the second robot 26, the contact 34-1 of the second robot side operator detector 34 is opened and the normally-closed contact 64-1 of the second operator detecting relay 64 is opened so that the second robot relay 65 is deenergized to open the normally-opened contact 65-2. Thus, the above position monitoring and/speed monitoring of the second robot 26 is released.

Within the dangerous region due to the operation of the second robot 26, if the first operator 29 interrupts the driving power source using an enable switch (not shown) included in the first pendant 23 of the first robot 21 or through the operation of emergency stopping, the first robot 21 is placed in the non-operable state. Thus, the output signal 22-1 is opened so that the first robot operable relay 61 connected thereto is deenergized to turn off. However, because of the presence of the above protection circuit, the second robot limiting relay 65 keeps its ON state while it is being energized. Thus, the position monitoring and/or speed monitoring of the second robot 26 is continued.

If the second operator 30 enters the operating range of the first robot 21 or the dangerous region due to the operation o the first robot, the first robot side operator detector 33 detects this fact. Thus, the contact 33-1 of the first robot side operator detector is closed so that the first operator detecting relay 62 is energized to turn on.

In this case, the operator detection/control device 32 carries out the operation corresponding to the above case where the first operator 29 enters the operating range of the second robot. The signal of the closing of the other normally-closed contact 66-2 of the first robot limiting relay 66 is supplied to the first robot control device 22. Thus, the position monitoring and/or speed monitoring of the first robot can be made by the first robot control device 22.

In this embodiment, the operator detection/control device 32 is explained with reference to a relay circuit. However, also where the signal corresponding to the robot limiting relay is supplied to the robot control device by the logical operation member such as a logic element or microcomputer, the same operational effect can be obtained.

Further, where the number of robots in the robot system is increased, by preparing the operator detectors for the robots, the connection between the operator detection/control device and each robot control device and each operator detector, and the circuit of the operator detection/control device in the manner of position monitoring and/or speed monitoring required for the robot system can be easily changed.

Since the operation of the robot to which the attention of the operator is not paid is limited through the configuration and operation described above, the operator can perform the teaching with great safety.

In the embodiment described above, a single robot is combined with a single robot control device. However, where the single robot control device controls a plurality of robots, it is needless to say that the position monitoring and/or speed monitoring for each robot can be made by preparing the position storage area, permitted value storage area and input unit for each robot in the robot control device.

INDUSTRIAL APPLICABILITY

This invention is usefully applied to a robot system and robot control apparatus in which the safety of workers is assured while a teacher performs working for a robot in a teaching playback system in access to the robot during his teaching.

The invention claimed is:

1. A robot control apparatus equipped with a pendant to be manipulated by a teacher, for controlling the operation of a robot on the basis of an operation command from the pendant, comprising:

a detecting device for detecting the position of the teacher;

a signal processing unit for receiving a signal from the detecting device to produce the position information of the teacher; and a limited speed selecting unit for selecting the operating speed of the robot on the basis of the position information, wherein the robot is controlled at the maximum operating speed selected by the limited speed selecting unit on the basis of the operation command from the pendant.

2. A robot control apparatus according to claim 1, wherein the operation of the robot is stopped by making the operation command to each the axis zero, or interrupting driving energy to the robot.

* * * * *